United States Patent [19]

Wachob

[11] Patent Number: 5,046,093

[45] Date of Patent: Sep. 3, 1991

[54] CATV SUBSCRIBER APPARATUS WITH INTELLIGENT REMOTE CONTROL

[75] Inventor: David E. Wachob, Elkins Park, Pa.

[73] Assignee: General Instrument Corporation, New York, N.Y.

[21] Appl. No.: 402,804

[22] Filed: Sep. 5, 1989

[51] Int. Cl.⁵ ...................... H04N 7/167; H04H 1/02; H04B 10/04; H04B 10/06

[52] U.S. Cl. ......................................... 380/20; 380/10; 358/86; 358/194.1; 358/349; 359/146; 341/176; 340/825.31; 340/825.34; 340/825.72; 379/93; 455/5; 455/6; 455/151

[58] Field of Search ................... 380/7, 10, 19, 20, 52; 358/349, 85, 86, 194.1; 379/93, 95, 102; 340/825.31, 825.34, 825.69, 825.72; 369/32–34; 455/603, 151, 3, 5, 6; 341/23, 176

[56] References Cited

U.S. PATENT DOCUMENTS

| | | | |
|---|---|---|---|
| 4,245,245 | 1/1981 | Matsumoto et al. | 380/7 |
| 4,626,848 | 10/1986 | Ehlers | 340/825.69 |
| 4,786,900 | 11/1988 | Karasawa et al. | 340/825.31 |
| 4,792,972 | 12/1988 | Cook, Jr. | 380/20 |

Primary Examiner—Bernarr E. Gregory
Attorney, Agent, or Firm—Barry R. Lipsitz

[57] ABSTRACT

Subscriber apparatus for a cable television system or the like comprises a converter/descrambler and a programmable remote control. All authorization data for premium services and features a subscriber is entitled to receive are stored in the remote control. Program/interface apparatus is provided to enable a subscriber to request additional premium services or features, such as pay-per-view programming. Authorization data for the requested services or features are transmitted by the program/interface apparatus to the remote control via an infrared signal path. A similar signal path is used by the remote control in controlling the converter/descrambler to provide the authorized services and features, such as the descrambling of a premium television channel.

44 Claims, 2 Drawing Sheets

CATV SUBSCRIBER APPARATUS WITH INTELLIGENT REMOTE CONTROL

BACKGROUND OF THE INVENTION

The present invention relates to subscriber apparatus for use in a cable television system or the like, and more particularly to a remotely controlled converter/descrambler (hereinafter "converter") where feature and program authorizations are programmed into a handheld remote control.

Cable television systems and other communication networks, such as satellite systems, typically provide subscribers with a choice of basic and premium services. Basic services are those that each subscriber is entitled to receive without additional charge over the basic monthly subscription fee. Premium services are provided at extra cost, and may include movie channels and special "pay-per-view" events such as concerts, sports events, and the like. In order to prevent subscribers from receiving premium programs without paying an additional fee for them, such programs are typically transmitted in a scrambled fashion over the cable television network.

A converter provided to the subscriber converts a selected channel to a predetermined channel (e.g., channel 3 or 4) to which a subscriber tunes a television set or other video appliance in order to receive the program. When a premium program is selected, the converter also descrambles the signal, if the subscriber is authorized to receive the program.

In existing systems, authorization data for premium services are stored in the subscriber's converter. Such authorization data may be loaded in the field by a technician, or downloaded from a cable system headend to individual addressable converters. Such "downloadable" cable television converters are described, for example, in commonly assigned U.S. Pat. No. 4,712,239 issued Dec. 8, 1987 to Frezza, et al. and entitled "Security Arrangement for Downloadable Cable Television Converters".

Systems incorporating addressable converters that are programmable from a headend controller are in widespread use today. However, such systems require the use of a relatively expensive converter, and when provided to a subscriber of only basic services, the use of such subscriber apparatus may not be cost effective. It would therefore be advantageous to provide a low cost converter apparatus that would suffice both for basic service subscribers and subscribers of premium services. Such apparatus must also function in a system providing pay-per-view programming, wherein means are provided for enabling customers to order pay-per-view services on a real-time basis, i.e., in the last few minutes before a program begins. One system that enables the ordering of pay-per-view programs on a real-time basis is provided in commonly owned U.S. Pat. No. 4,710,955 issued Dec. 1, 1987 to Kauffman, and entitled "Cable Television System With Two-Way Telephone communication Path". The system in that patent overcomes the limitations of past real-time ordering systems, by providing a store and forward technology wherein subscribers' cable television converters are pre-loaded with purchase credits against which pay-per-view programs can be ordered. An addressable controller at the system headend collects program purchase information from converters on a non-real-time basis for subsequent billing.

To date, no system has been proposed wherein a simple, low cost converter can be used to provide both basis services and optional premium services without providing premium service authorization data in the converter itself. Prior art systems providing programmability of features and services have all relied on relatively expensive hardware, such as an FM data receiver and programmable memory provided in the converter itself.

It is an object of the present invention to provide a low cost converter that enables premium programs and optional features to be provided at additional cost to interested subscribers.

It is another object of the invention to provide subscriber apparatus, including a converter and remote control, for enabling interested subscribers to purchase pay-per-view services on a real-time basis.

It is a further object of the present invention to provide apparatus for reporting the purchase of pay-per-view services to a system headend controller on a non-real-time basis.

It is a still further object of the present invention to provide a programmable, handheld remote control that contains the hardware necessary to receive and store premium service and feature authorization data to enable a converter to provide premium programs and features to a subscriber.

It is yet another object of the present invention to provide a handheld remote control wherein the hardware and software necessary for authorizing premium services and features is contained in the remote control, which is optional and not provided to a subscriber of only basic services.

It is another object of the present invention to provide apparatus for programming the handheld remote control with new authorization data for premium services and features.

It is also an object of the present invention to provide security means, for preventing a handheld remote control that contains authorizations for one subscriber to be used with another subscriber's converter.

SUMMARY OF THE INVENTION

In accordance with the present invention, subscriber apparatus is provided comprising a converter and remote control. The converter includes input terminal means for coupling a plurality of program signals to a signal path. Descrambler means are coupled to the signal path, for descrambling premium program signals included in the plurality of program signals. Means, coupled to the signal path and responsive to the remote control, are provided for outputting a descrambled premium program signal for reception on a subscriber's video appliance (e.g., television set) upon authorization from the remote control. The remote control includes memory means for storing data authorizing the reproduction of a premium program signal and means for selecting the premium program signal for reproduction. The remote control further includes transmitter means, responsive to the selecting means and data stored in the memory means, for transmitting a signal to the converter authorizing the output of the selected premium program signal for reproduction. The premium program signals to be received may be either television signals, radio signals, stereo audio signals, or any other type of programming provided in a communication system such as, but not limited to, a cable television system.

The subscriber apparatus can further comprise telephone interface means, responsive to the remote control, for transmitting data from the remote control to a headend controller via a telephone network. The telephone interface means can comprise means for storing the data from the remote control for subsequent forwarding to the headend controller on a non-real-time basis. The telephone interface means can also comprise means for transmitting authorization data received from the headend controller to the remote control for storage in the memory means. Security means can also be provided, responsive to a signal transmitted from the remote control, for verifying that the remote control is legitimate before enabling the transmission of authorization data from the telephone interface means to the remote control for storage in the memory means. Additional security is provided by means, responsive to a signal transmitted from the remote control, for verifying that the remote control is legitimate before enabling the reproduction of a premium program signal.

In one embodiment, the descrambler means is responsive to the remote control to descramble only premium program signals that are authorized for reproduction. If a nonauthorized premium program signal is selected, it will not be descrambled. In another embodiment, the remote control only allows the selection of program signals authorized for reproduction. An attempt to select a nonauthorized signal will be ignored.

Special event program authorization means, independent of the converter and responsive to a program order signal from the remote control, can be provided for transmitting special event program authorization data to the remote control for storing in the memory means. Once the authorization data are stored, the applicable special event program may be selected and authorized for reproduction. A timer may be provided in the remote control, to which the memory means is responsive for deleting the special event authorization data after a predetermined time period. The special event program authorization means may be interfaced to a telephone network for communication with a headend controller, either on a real-time or non-real-time basis. Security means is provided to enable the special event program authorization means to verify that the remote control is legitimate before transmitting the special event authorization data.

The present invention also provides a programmable remote control for use with a cable television converter or the like. The remote control comprises a computer processor and memory means coupled to the computer processor for storing data authorizing the reproduction of a premium program signal. Means are coupled to the computer processor for selecting the premium program signal for reproduction, and transmitter means transmits a signal to a converter enabling the reproduction o the selected premium program signal. The signal transmitted by the transmitter means can comprise a descrambler enable signal to provide descrambling of an authorized, scrambled premium program.

The remote control can further comprise means responsive to the computer processor for requesting premium program authorization data from an external source. Receiver means, coupled to the computer processor, receives premium program authorization data from the external source. Timer means can be provided for deleting premium program authorization data after a predetermined time period. Security means transmits a signal to the external source to verify that the remote control is legitimate, before receiving premium program authorization data. The remote control can enable the selection means to select any of a plurality of premium and nonpremium program signals authorized for reproduction by data stored in the memory means, while prohibiting the selection of any other, nonauthorized program signals.

A converter for receiving premium service authorizations from a remote control in accordance with the present invention comprises input terminal means for coupling a plurality of program signals from a cable television system or the like to a signal path. Means, independent of the input terminal means, receives remotely generated control signals. Tuner means, coupled to the signal path and responsive to control signals received by the receiving means, tunes to a program signal from the plurality of program signals input to the converter. Descrambler means, coupled to the signal path and responsive to control signals received by the receiving means, descrambles a premium program signal tuned by the tuner means only if authorized by the control signals. The receiving means can comprise an infrared ("I/R") detector or the like for receiving control signals from a handheld remote control. An FM tap coupled to the signal path can be enabled to output FM radio signals in response to an authorization signal received by the receiving means. A stereo audio signal tap coupled to the signal path can be enabled to output stereo audio signals in response to an authorization signal received by the receiving means.

Subscriber apparatus for ordering premium services over a cable television system or the like is also provided. A first receiver means receives a premium service order signal from a remote control. First transmitter means, responsive to an order signal received by the first receiver means, transmits premium service authorization data to the remote control. Second transmitter means, responsive to an order signal received by the first receiver means, transmits premium service order data to a headend controller. Second receiver means receives premium service authorization data from the headend controller for subsequent transmission to the remote control by the first transmitter means. Means are provided for interfacing the second transmitter and second receiver means to a telephone network for communication with the headend controller. Data indicative of a premium service order received by the first receiver means may subsequently be forwarded to a headend controller on a non-real-time basis. Security means, responsive to a signal received from the remote control, can verify that the remote control is legitimate before loading premium service authorization data into the remote control.

The present invention also provides a device for programming a handheld remote control with data authorizing the receipt of services or the use of features by apparatus controlled by the remote control. The device comprises means for generating authorization data, and transmitter means, coupled to receive the generated data, for transmitting the data to a remote control. Security means verifies that the remote control is legitimate before transmitting the data. A unique code may be transmitted to the remote control, rendering the remote control functional only with apparatus containing a corresponding code. Means can be provided for receiving a program request signal from the remote control, to which the generating means is responsive for generating authorization data to be transmitted to the remote control.

A handheld remote control for use with a cable television converter in accordance with the present invention comprises means for receiving remotely transmitted data necessary to implement one or more subscriber features. Memory means stores data from the receiving means, which data is retrieved by a processor for generating signals to be used in implementing subscriber features. The signals are transmitted to a converter by the remote control.

Security means provides a unique security code to be transmitted by the remote control, which limits use of the remote control to a converter having a corresponding security code.

The remote control's processor can generate signals to implement a channel mapping feature. The processor can also generate signals to implement a barker channel feature, wherein the converter is forced to tune to a special channel containing advertising, a directory, and/or music when an unauthorized service is requested by a subscriber. Other features that can be implemented include an FM radio reception feature and a stereo sound feature. The remote control can also be used to implement the descrambling of a scrambled television channel.

By generating a signal to request additional data for storage in the memory means, additional features can be implemented by the remote control. The signal generating means is coupled to the transmitting means for transmission of a data request signal to a programming facility. The receiving means enables the receipt of additional data from the programming facility for storage in the memory means. Security means can be provided for transmitting a signal to the programming facility, in order to verify that the remote control is legitimate before receiving additional data. Timer means can be provided for deleting additional data from the memory means after a predetermined time period.

DETAILED DESCRIPTION OF THE INVENTION

The subscriber apparatus of the present invention is useful in a cable television system as well as any other communication system in which various features or levels of service are available to a subscriber. The term "cable television" as used in the present specification and claims is meant to encompass all such communication systems, and not be limited to television communications.

Similarly, the term "pay-per-view" is not meant to be limited solely to television programs ordered via a cable television network. A pay-per-view program can be any special premium program ("special event") ordered by a subscriber, whether it be a television program, an audio program such as a concert, or other special service or feature.

The "reproduction" of a program signal refers to the playback of a program in intelligible form for viewing and/or listening. In the cable television environment, a "descrambler" is used to convert scrambled program signals into proper signals for reproduction on a television set or other video appliance, such as a VCR. In systems other than cable television systems, a decoder may be used to provide an intelligible signal for reproduction. The use of the term "descrambler" herein is intended to be synonymous with the term "decoder" and other equivalent terms.

Figure 1:
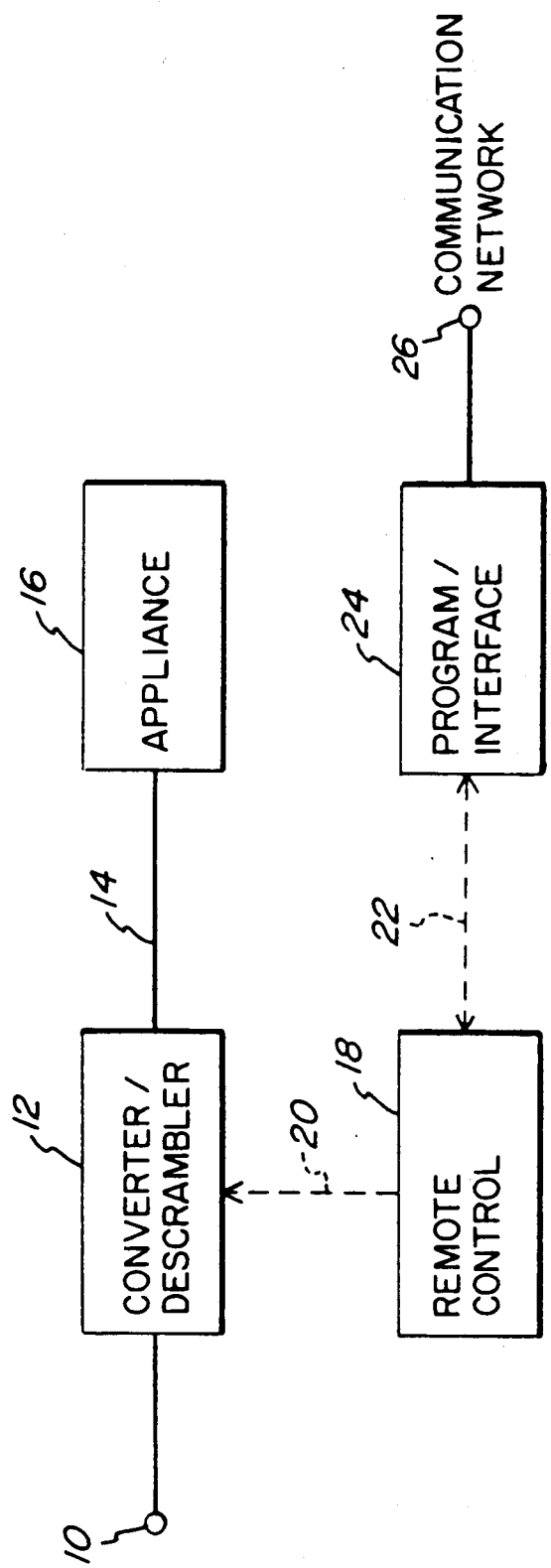
FIG. 1 is a block diagram of the system of the present invention illustrating a converter ("converter/descrambler"), handheld remote control, and telephone interface means.

Turning now to the figures, FIG. 1 is a block diagram of subscriber apparatus for use in a cable television system or the like, in accordance with the present invention. A plurality of program signals is input via terminal 10 to a converter ("converter/descrambler") 12. The program signals can, for example, be carried via a cable television network. Converter 12 is used to select one of the program signals at a time for reproduction on a subscriber's appliance 16, which is coupled to the converter via signal path 14. When used in connection with a cable television system, converter 12 converts the selected program signal to a predetermined channel (e.g., channel 3 or 4) for input to the subscriber's appliance 16 (i.e., television set or VCR), as well known in the art. It will be appreciated that appliance 16 could also be a radio receiver or stereo amplifier where audio signals are to be reproduced.

A remote control 18 communicates with converter 12 via a signal path 20, which may be an infrared ("I/R") signal path or other suitable transmit/receive remote control scheme. In accordance with the present invention, remote control 18 carries the intelligence necessary to authorize converter 12 to provide a premium program signal for reproduction, if a subscriber using the converter is entitled to receive the premium program. Remote control 18 may be programmed with the authorization data at a central facility of the communication system operator, or may be programmed at the subscriber's home via program/interface apparatus 24. A bi-directional communications link 22 is provided between remote control 18 and program/interface apparatus 24 to enable the remote control to request and receive new authorization data from the program/interface apparatus. Communication link 22 may be an infrared signal path or the like, similar to signal path 20. The program/interface apparatus can, in turn, communicate with a headend apparatus to obtain or report on authorization data, via a telephone or other communication network coupled to terminal 26.

Figure 2:
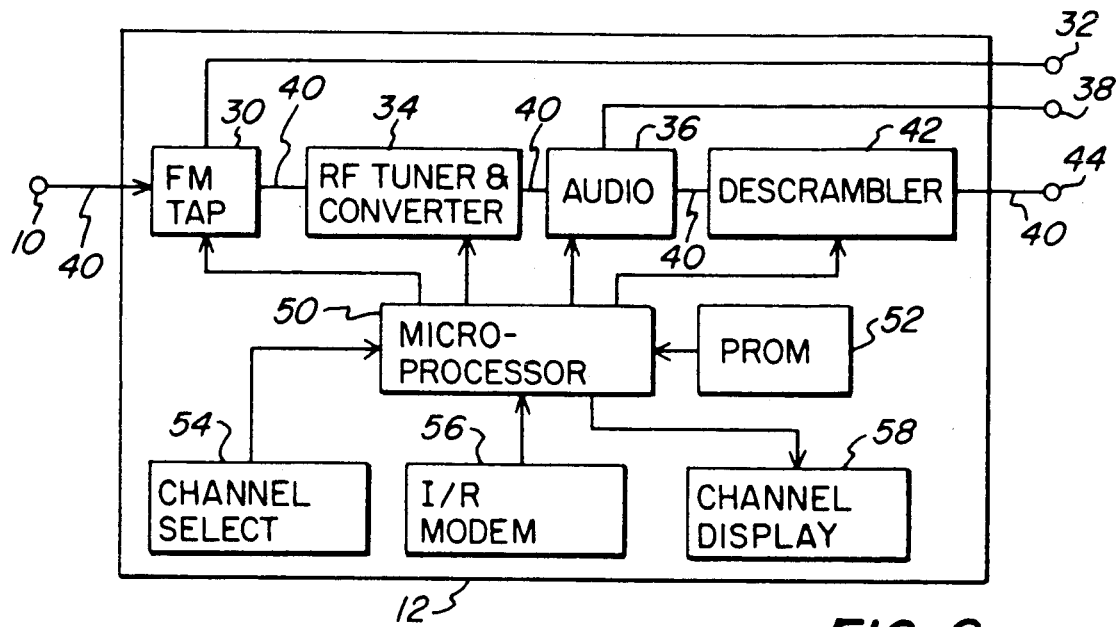
FIG. 2 is a detailed block diagram of a converter in accordance with the present invention.

Turning now to FIG. 2, a block diagram is provided depicting converter 12 in greater detail. In the embodiment shown, converter 12 is particularly adapted for use in a cable television system, having a plurality of nonscrambled channels together with scrambled premium channels. A cable signal input at terminal 10 is received via a signal path 40 by an FM tap 30 that, when enabled, outputs the FM band of radio signals at terminal 32. A microprocessor 50 can enable FM tap 30 to output the FM radio signals, in response to a signal received from remote control 18 by an I/R modem 56.

An RF tuner and converter 34 is coupled to signal path 40 for selecting a particular program signal (i.e., cable television channel) and for converting the selected signal to a predetermined channel (e.g., channel 3) for output to a subscriber's television set, VCR, or the like. A subscriber may select a channel for reproduction using a conventional channel select keyboard 54 or the like. The channel selection means is coupled to microprocessor 50, which in turn tunes RF tuner and converter 34 in a conventional manner. Channel selection can alternately be effected using remote control 18, in which case channel selection signals received from the remote control by I/R modem 56 are input to microprocessor 50. The output from RF tuner and converter 34 is coupled, via signal path 40 and terminal 44, to a user's video appliance. Microprocessor 50 drives a channel display 58, which can comprise a conventional LED display, to indicate to a subscriber the cable channel that is currently tuned.

An audio circuit 36 is coupled to signal path 40 and provides a stereo audio signal and/or volume control output on terminal 38, in response to an enable signal received from microprocessor 50. If the subscriber is authorized to receive the audio output from audio circuit 36, I/R modem 56 will receive an audio authorization signal from remote control 18, and instruct microprocessor 50 to enable audio circuit 36.

A descrambler 42 is coupled to signal path 40 for outputting, on terminal 44, a descrambled premium program signal for reproduction on a subscriber's video appliance. In accordance with the present invention, descrambler 42 operates under the control of microprocessor 50, which will enable the descrambler only if an authorization signal for the channel to be descrambled is first received from remote control 18 via I/R modem 56.

A PROM 52 stores program data required for the proper execution of microprocessor 50. One feature provided by the present invention is a security scheme, wherein remote control 18 cannot be used to control a converter unless a unique code in the remote control unit matches a corresponding code stored in the converter. In implementing this feature, PROM 52 is used to store the unique security code for converter 12.

The various blocks shown in the converter of FIG. 2 are well known, and can be found, for example, in the Jerrold IMPULSE 7000 Model DPBB73 addressable converter manufactured by General Instrument Corporation, Jerrold Subscriber Systems Division, Hatboro, Pa., U.S.A. In accordance with the present invention, however, converter 12 does not include the intelligence provided in prior art addressable converters. The converter 12 of the present invention is therefore substantially lower in cost than prior art converters, particularly since the FM data receiver and memory necessary for authorization storage is not included.

In the system of the present invention, a subscriber desiring only basic, nonpremium services is provided with converter 12, but not with remote control 18 nor program/interface apparatus 24. Channel select keyboard 54 is used by the subscriber to tune to a desired nonscrambled channel, which is output directly on terminal 44 for input to the subscriber's video appliance 16. Without remote control 18, the subscriber will not be able to view premium programs, since there will be no way for microprocessor 50 to receive a descrambler enable signal via I/R modem 56. Nor, will the subscriber be able to receive FM radio signals on terminal 32 or stereo audio/volume control signals on terminal 38, since there will be no way to enable FM tap 30 or audio circuitry 36. The cable system operator will install the relatively inexpensive converter 12 without providing the more expensive remote control unit 18, that carries the intelligence necessary to authorize premium services and features.

Figure 3:
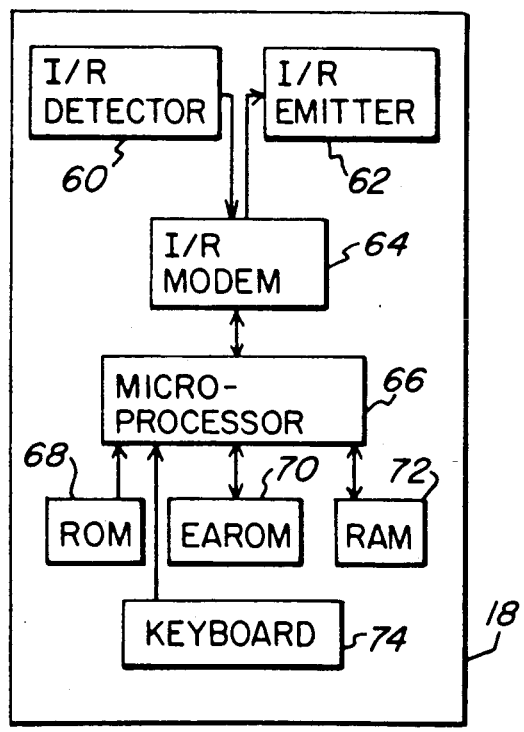
FIG. 3 is a detailed block diagram of a handheld remote control in accordance with the present invention.
Figure 4:
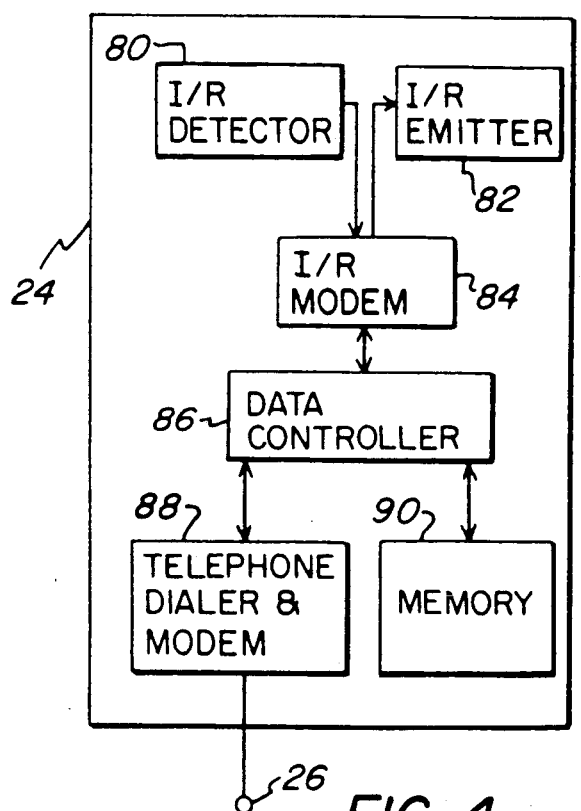
FIG. 4 is a detailed block diagram of a telephone interface in accordance with the present invention.

With the addition of optional remote control 18, a subscriber can obtain premium services and additional features such as channel mapping, barker channel, addressable FM bypass, stereo sound output, and remote volume control. A detailed block diagram of handheld remote control 18 is provided in FIG. 3. Remote control 18 communicates with converter 12 via an I/R emitter 62, coupled to microprocessor 66 via I/R modem 64. Operating software for microprocessor 66 is stored in ROM 68 in a conventional manner. Similarly, operating memory is provided by RAM 72. Electrically alterable read-only memory ("EAROM") 70 is provided for the storage of authorization data, enabling the remote control to transmit signals to converter 12 authorizing the converter to output a selected premium program signal for reproduction. A subscriber selects programs for reproduction via a conventional keyboard 74 that is coupled to microprocessor 66.

Remote control 18 may be programmed with authorization data for a particular subscriber at a central programming facility operated by the cable system operator. Alternately, programming of the remote control can be accomplished in the subscriber's home via optional program/interface apparatus 24. This apparatus is coupled, via terminal 26, to a communication network such as a telephone system. In this manner, apparatus 24 can communicate with a remote headend controller to receive new authorization data to be programmed into remote control 18, and to transfer data to the headend controller concerning programs and services that a subscriber has requested via remote control 18. For example, a subscriber may wish to receive a special event, pay-per-view television program. The user will enter a code on keyboard 74 of remote control 18 for the requested program, while pointing the I/R emitter 62 of the remote control at I/R detector 80 of apparatus 24. The request signal will be detected, and coupled to a data controller 86 via I/R modem 84. Data controller 86 comprises a microprocessor that performs several functions. Software for data controller 86 is stored in memory 90, in a conventional manner.

One function of data controller 86 is to transmit authorization data back to remote control 18 either when requested by the subscriber, or when directed to do so by a remote headend controller communicating via a communication network coupled to terminal 26. Communication between data controller 86 and the remote headend controller can be initiated by the data controller using telephone dialer and modem 88, or by the headend controller. In the event the headend controller wishes to initiate the communication, it calls the program/interface apparatus 24 and the call is answered by telephone dialer and modem 88. Data is then transferred from the remote headend to data controller 86, and stored in memory 90 as necessary.

In the event data controller 86 wishes to initiate a communication with the remote headend controller, a telephone communication is initiated by telephone dialer and modem 88, which dials the telephone number of the remote headend controller to establish the communication.

Upon processing a subscriber's request for a new premium service or feature, data controller 86 transmits authorization data, via I/R emitter 82, to remote control 18. The transmitted data is received by I/R detector 60, and coupled to microprocessor 66 of the remote control via I/R modem 64. The authorization data is stored in EAROM 70. The subscriber then points the remote control at converter 12, where I/R modem 56 receives control signals from I/R emitter 62 for use in controlling microprocessor 50. In the event a premium television program is to be viewed, and the proper authorization data is stored in EAROM 70, microprocessor 50 will be instructed to enable descrambler 42 to descramble the premium signal for output on terminal 44. Where a subscriber orders a pay-per-view program, a timer routine can be provided in the software contained in ROM 68 to delete the authorization data for that program from EAROM 70 after a predetermined time period.

Program/interface apparatus 24 can transmit billing information to the remote headend controller, for services and features requested by a subscriber via remote control 18, on either a real-time or non-real-time basis. Where real-time operation is desired, a program request from the subscriber will immediately cause data controller 86 to telephone the remote headend via telephone dialer and modem 88, to request the necessary authorization data and at the same time enable the headend controller to bill the subscriber. The authorization data will be transmitted from the headend controller to program/interface apparatus 24, for immediate transmission to the remote control 18. Where non-real-time operation is desired, authorization data will be generated directly by data controller 86 upon request for authorization by a subscriber via remote control 18. Data indicative of the subscriber's request will be stored in memory 90, for subsequent forwarding to the headend controller at a later time. Program/interface apparatus 24 can be authorized by the headend controller to program remote control 18 with a predetermined number of transaction credits on a periodic basis, enabling the subscriber to select any pay-per-view programs desired until the transaction credits are used up. Additional transaction credits can be programmed into remote control 18, on a periodic basis or upon request by the subscriber, by program/interface apparatus 24 in accordance with authorization received from the headend controller.

Like communication between remote control 18 and converter 12, communication between the remote control and program/interface apparatus 24 can be prohibited unless a security code stored in the remote control (e.g., in EAROM 70) matches a corresponding code maintained by apparatus 24 (e.g., in memory 90). The security code can be programmed into the remote control by the program/interface apparatus, or during manufacture. When a subscriber requests authorization data from apparatus 24, remote control 18 transmits the security code. No authorization data will be transmitted back to remote control 18 from apparatus 24 until the security code is verified. All communication between the remote control 18 and converter 12 or apparatus 24 can also be implemented on an addressable basis, so that communication can only occur between specific devices assigned to the same subscriber.

It should now be appreciated that the present invention provides subscriber apparatus for use in a cable television system or the like that is extremely flexible. A low cost, basic converter can be provided to every subscriber on the system. If a subscriber desires premium services and features, these are provided by a programmable, handheld remote control that contains authorization data necessary to enable the converter to output descrambled premium services for reproduction, and to provide special features. Either audio and/or video signals can be descrambled to provide for the reproduction of premium television, radio, or other audio services and the like. Changing premium services at an individual subscriber location is accomplished by reprogramming the handheld remote control, either at the subscriber's home or at a central facility run by the system operator.

The provision of separate program/interface apparatus provides additional system flexibility. This apparatus, with its telephone interface, can be placed at any location near a telephone line and does not have to be near the converter. Thus, a subscriber is not required to install a new telephone line near each converter in his or her home. Only one program/interface apparatus is required at each subscriber location. This provides a substantial cost advantage over prior art addressable converters that each require all of the hardware necessary for requesting and obtaining premium program authorizations.

The remote control can be used to implement various features, including channel mapping, last channel recall, favorite channel, barker channel, parental control, FM radio reception, premium channel descrambling, stereo sound output, and volume control. When used in combination with the program/interface apparatus, impulse pay-per-view program ordering and opinion polling is also readily available.

While the present invention has been described in connection with a preferred embodiment, those skilled in the art will appreciate that various adaptations and modifications may be made thereto without departing from the spirit and scope of the invention, as set forth in the following claims.

I claim:

1. Subscriber apparatus comprising a converter and a remote control,
    said converter including:
        input terminal means for coupling a plurality of program signals to a signal path,
        descrambler means, coupled to said signal path, for descrambling premium program signals included in said plurality, and
        means, coupled to said signal path and responsive to said remote control, for outputting a descrambled premium program signal for reproduction upon authorization from said remote control;
    and wherein said remote control includes:
        memory means for storing data authorizing the reproduction of a premium program signal;
        means for selecting said premium program signal for reproduction, and
        transmitter means, responsive to said selecting means and data stored in the memory means, for transmitting a signal to said converter authorizing the output of the selected premium program signal for reproduction.

2. The apparatus of claim 1 further comprising:
    interface means, responsive to said remote control, for transmitting data from the remote control to a headend controller via a communication network.

3. The apparatus of claim 2 wherein said interface means comprises means for storing data from said remote control for subsequent forwarding to the headend controller on a non-real-time basis.

4. The apparatus of claim 2 wherein said interface means comprises means for transmitting authorization data received from said headend controller to the remote control for storage in said memory means.

5. The apparatus of claim 4 wherein said interface means comprises security means, responsive to a signal transmitted from said remote control, for verifying that the remote control is legitimate before enabling the transmission of authorization data for storage in said memory means.

6. The apparatus of claim 1 further comprising security means, responsive to a signal transmitted from said remote control, for verifying that the remote control is legitimate before enabling the reproduction of a premium program signal selected via the remote control.

7. The apparatus of claim 1 wherein said descrambler means is responsive to said remote control to descramble only premium program signals that are authorized for reproduction.

8. The apparatus of claim 1 wherein said remote control only allows the selection of program signals authorized for reproduction.

9. The apparatus of claim 1 further comprising:
special event program authorization means, independent of said converter and responsive to a program order signal from said remote control, for transmitting special event program authorization data to said remote control for storing in said memory means, thereby enabling a special event program to be selected and authorized for reproduction.

10. The apparatus of claim 9 wherein said remote control comprises a timer, and said memory means is responsive to said timer for deleting said special event program authorization data after a predetermined time period.

11. The apparatus of claim 9 further comprising means for interfacing said special event program authorization means to a telephone network for communication with a headend controller.

12. The apparatus of claim 11 wherein said special event program authorization means comprises means for storing data indicative of a program order signal from said remote control, for subsequent forwarding to the headend controller via a telephone communication on a non-real-time basis.

13. The apparatus of claim 9 wherein said special event program authorization means comprises security means, responsive to a signal transmitted from the remote control, for verifying that the remote control is legitimate before transmitting said special event authorization data.

14. The apparatus of claim 1 wherein said converter is used to enable the reproduction of scrambled television signals upon authorization from said remote control.

15. A programmable remote control for use with a signal converter comprising:
a computer processor;
memory means coupled to said computer processor for storing data authorizing the reproduction of a premium program signal;
means coupled to said computer processor for selecting said premium program signal for reproduction; and
transmitter means, responsive to said computer processor, for transmitting a signal to a converter enabling the reproduction of the selected premium program signal.

16. The remote control of claim 15 wherein the signal transmitted by said transmitter means comprises a descrambler enable signal.

17. The remote control of claim 15 further comprising:
means, coupled to said computer processor, for requesting premium program authorization data from an external source.

18. The remote control of claim 17 wherein a request for premium program authorization data is transmitted by said transmitter means, and said remote control further comprises:
receiver means, coupled to said computer processor, for receiving premium program authorization data from said external source.

19. The remote control of claim 18 further comprising timer means operatively associated with said computer processor, for deleting premium program authorization data after a predetermined time period.

20. The remote control of claim 15 further comprising:
receiver means, coupled to said computer processor, for receiving premium program authorization data from an external source.

21. The remote control of claim 20 further comprising:
security means, operatively associated with said computer processor, for transmitting a signal to said external source to verify that the remote control is legitimate before receiving premium program authorization data.

22. The remote control of claim 15 further comprising:
means, operatively associated with said computer processor, for enabling said selection means to select any of a plurality of premium and non-premium program signals authorized for reproduction by data stored in said memory means, while prohibiting the selection of other, nonauthorized program signals.

23. A converter for receiving premium service authorizations from a remote control, comprising:
input terminal means for coupling a signal path to a source of program signals;
means, independent of said input terminal means, for receiving remotely generated control signals;
tuner means, coupled to said signal path and responsive to control signals received by said receiving means, for tuning to a program signal from said source; and
descrambler means, coupled to said signal path and responsive to control signals received by said receiving means, for descrambling a premium program signal tuned by said tuner means only if authorized by said control signals.

24. The converter of claim 23 wherein said receiving means comprises an I/R detector for receiving control signals from a handheld remote control.

25. The converter of claim 23 further comprising:
an FM tap coupled to said signal path; and
means for enabling said FM tap to output FM radio signals in response to an authorization signal received by said receiving means.

26. The converter of claim 23 further comprising:
a stereo audio signal tap coupled to said signal path; and means for enabling said stereo audio signal tap to output stereo audio signals in response to an authorization signal received by said receiving means.

27. Subscriber apparatus for programming a remote control used in ordering premium services over a communication network, comprising:
a data controller coupled to communicate with a headend controller;
first receiver means coupled to said data controller for receiving a premium service order signal from a remote control;
means operatively associated with said data controller and responsive to data received from said headend controller for providing premium service authorization data in response to an order signal received by said first receiver means; and
first transmitter means responsive to said data controller, for transmitting said premium service authorization data to said remote control.

28. The apparatus of claim 27 further comprising:
second transmitter means, responsive to an order signal received by said first receiver means, for transmitting premium service order data from said data controller to said headend controller; and
second receiver means, for receiving data from said headend controller for subsequent transmission to said remote control by the first transmitter means.

29. The apparatus of claim 28 further comprising:
means for interfacing said second transmitter and second receiver means to a telephone network for communication with said headend controller.

30. The apparatus of claim 27 further comprising:
means for storing data indicative of a premium service order received by said first receiver means; and
means for subsequently forwarding said data to the headend controller on a non-real-time basis.

31. The apparatus of claim 27 further comprising:
security means, responsive to a signal received from said remote control, for verifying that the remote control is legitimate before transmitting said premium service authorization data.

32. A device for programming a handheld remote control with data authorizing the receipt of services or use of features by apparatus controlled by the remote control, comprising:
a data controller;
means operatively associated with said data controller and responsive to data received from a headend for generating authorization data for use by a remote control; and
transmitter means, coupled to receive the generated data from said data controller, for transmitting said data to said remote control.

33. The device of claim 32 further comprising:
security means, responsive to a signal received from said remote control, for verifying that the remote control is legitimate before transmitting said data.

34. The device of claim 32 further comprising:
means for transmitting a unique code to said remote control, wherein said code renders the remote control functional only with apparatus containing a corresponding code.

35. The device of claim 32 further comprising:
means for receiving a program request signal from said remote control, wherein said generating means is responsive to the receiving means to generate authorization data for transmission to the remote control.

36. A handheld remote control for use with a cable television converter comprising:
means for receiving remotely transmitted data necessary to implement one or more subscriber features;
memory means coupled to receive and store data from said receiving means;
processor means, coupled to retrieve data from said memory means, for generating signals to be used in implementing subscriber features;
means responsive to said processor means for transmitting said signals to a cable television converter; and
security means, coupled to said transmitting means, for providing a unique security code to be transmitted enabling the use of the remote control only with a converter having a corresponding security code.

37. The remote control of claim 36 wherein said processor generates signals to implement a channel mapping feature.

38. The remote control of claim 36 wherein said processor generates signals to implement a barker channel feature.

39. The remote control of claim 36 wherein said processor generates signals to implement an FM radio reception feature.

40. The remote control of claim 36 wherein said processor generates signals to implement a stereo sound feature.

41. The remote control of claim 36 wherein said processor generates signals to implement the descrambling of a scrambled television channel.

42. A handheld remote control for use with a cable television converter comprising:
means for receiving remotely transmitted data necessary to implement one or more subscriber features;
memory means coupled to receive and store data from said receiving means;
processor means, coupled to retrieve data from said memory means, for generating signals to be used in implementing subscriber features;
means responsive to said processor means for transmitting said signals to a cable television converter;
means for generating a data request signal to request additional data for storage in said memory means to implement additional features; and
means for coupling said signal generating means to the transmitting means for transmission of the data request signal to a programming facility;
wherein said receiving means enables the receipt of additional data from said programming facility for storage in said memory means.

43. The remote control of claim 42 further comprising:
security means, coupled to said transmitting means, for transmitting a signal to said programming facility to verify that the remote control is legitimate before receiving additional data.

44. The remote control of claim 43 further comprising:
timer means for deleting additional data from said memory means after a predetermined time period.

* * * * *